United States Patent [19]

Evans et al.

[11] Patent Number: 4,924,395
[45] Date of Patent: May 8, 1990

[54] SYNCHRONOUS WHEEL SLIP STRATEGY FOR A LOCOMOTIVE GOVERNOR

[75] Inventors: Raymond G. Evans, Washington; Walter E. Earleson, Peoria; Joseph W. Richardson, Jr., East Peoria, all of Ill.

[73] Assignee: Caterpillar Inc., Peoria, Ill.

[21] Appl. No.: 337,514

[22] Filed: Apr. 13, 1989

[51] Int. Cl.$^5$ .............................................. B61C 15/08
[52] U.S. Cl. ....................... 364/426.02; 364/426.05; 318/52; 180/197; 303/100
[58] Field of Search ....................... 364/426.02, 426.03, 364/426.05; 180/197; 303/100, 94, 109; 318/52; 246/182 A

[56] References Cited

U.S. PATENT DOCUMENTS

| | | | |
|---|---|---|---|
| 3,577,048 | 5/1971 | Nordin | 318/52 |
| 3,982,164 | 9/1976 | de Buhr et al. | 318/52 |
| 3,997,822 | 12/1976 | Logston, Jr. et al. | 318/52 |
| 4,035,698 | 7/1977 | Söderberg | 318/52 |
| 4,065,975 | 1/1978 | Giessner | 73/510 |
| 4,136,303 | 1/1979 | Almquist et al. | 318/52 |
| 4,190,220 | 2/1980 | Hahn et al. | 246/182 B |
| 4,347,569 | 8/1982 | Allen, Jr. et al. | 364/426.03 |
| 4,392,091 | 7/1983 | Roberts et al. | 318/52 |
| 4,463,289 | 7/1984 | Young | 318/52 |
| 4,498,016 | 2/1985 | Earleson et al. | 290/40 |
| 4,588,932 | 5/1986 | Riondel | 318/52 |
| 4,671,577 | 6/1987 | Woods | 303/3 |
| 4,799,161 | 1/1989 | Hirotsu et al. | 364/426.01 |

FOREIGN PATENT DOCUMENTS 1123496  5/1982  Canada .................................. 341/74

OTHER PUBLICATIONS

Article titled "Microprocessor Control of Wheel Slip" published in May, 1985, Joint ASME/IEEE Railroad Conference, New York, N.Y.

Primary Examiner—Thomas G. Black
Attorney, Agent, or Firm—Robert E. Muir

[57] ABSTRACT

Synchronous wheel slip control is desirable in a locomotive having wheels driven by at least one traction motor which receives power from an engine driven generator. Wheel slip control in known systems involves increased cost and complexity resulting from sensors required to determine an actual locomotive speed. In the subject invention a microprocessor under software control is used to detect and control synchronous wheel slip. Generator current and voltage are measured and used in an empirical relationship to calculate an actual locomotive speed. A first-order-lag of the actual locomotive speed is calculated and compared to the calculated locomotive speed. If the compared values differ by more than a preselected reference a synchronous slip condition exists and the generator power is reduced by a preselected magnitude. The generator power is incrementally reduced until the synchronous slip condition is no longer detected. The cost of controlling wheel slip is reduced since no sensors are required for detecting actual locomotive speed.

20 Claims, 7 Drawing Sheets

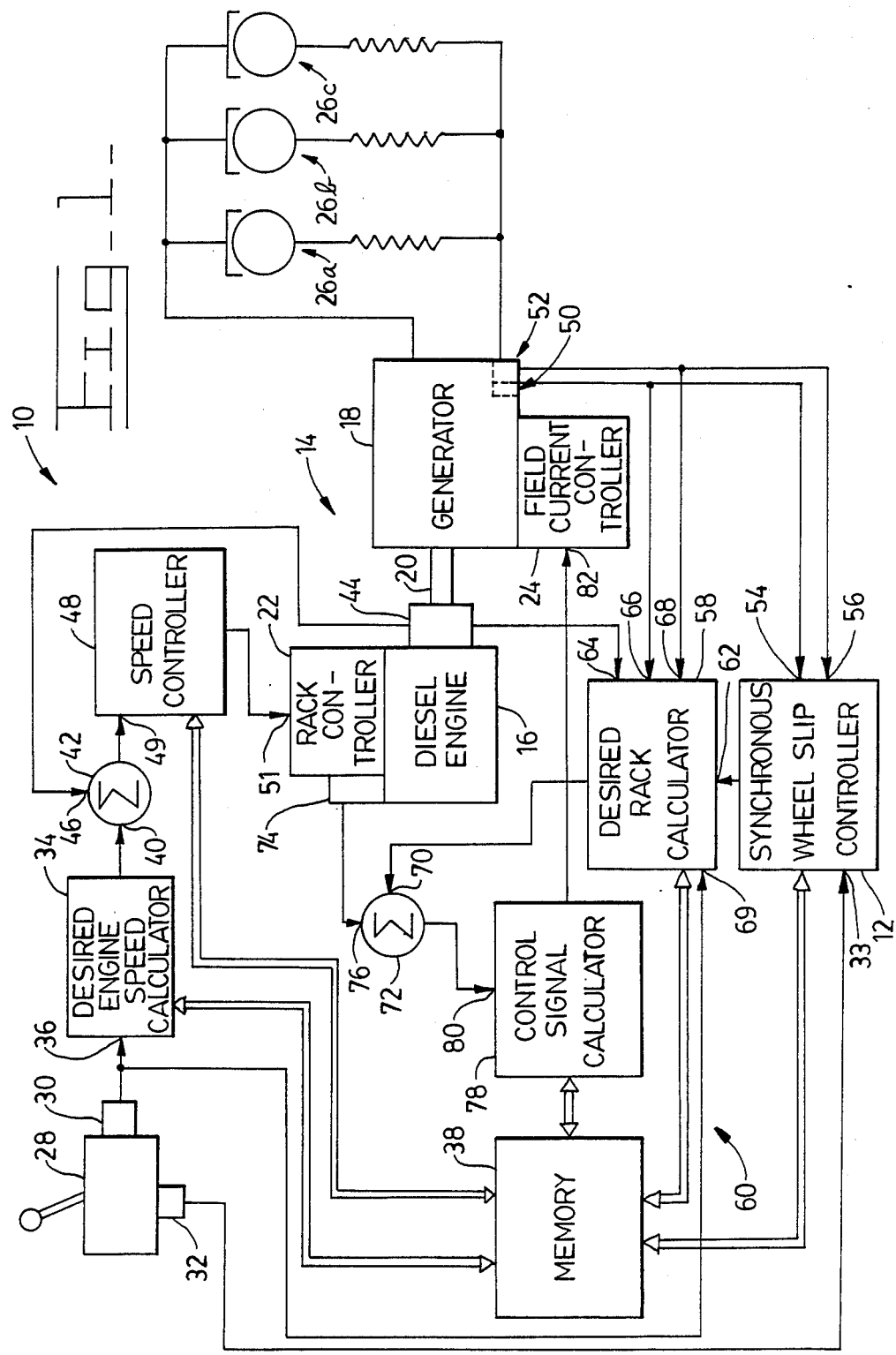

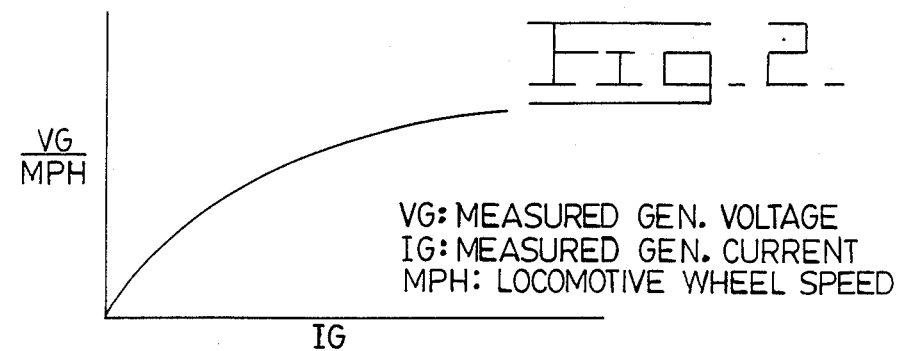
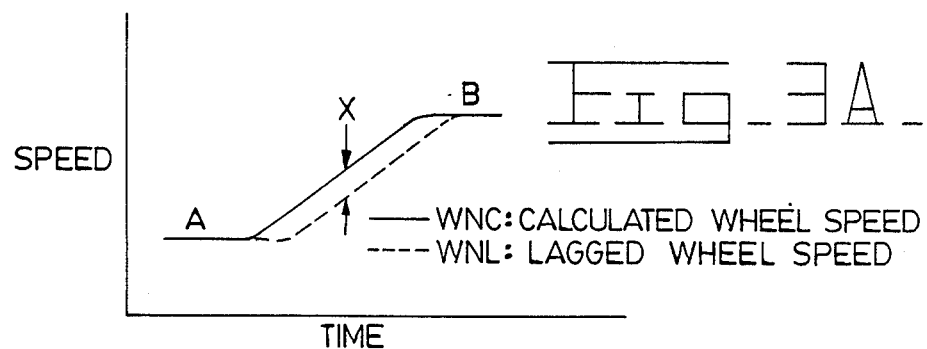
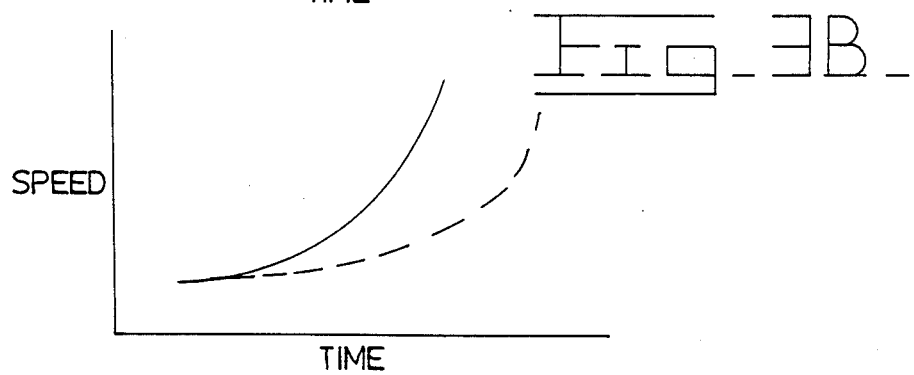
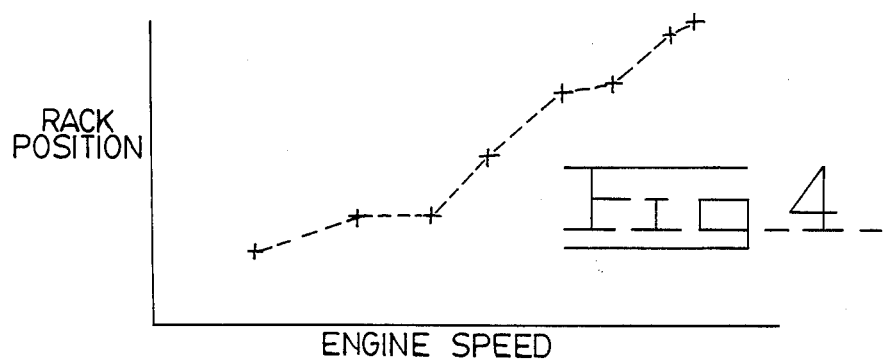

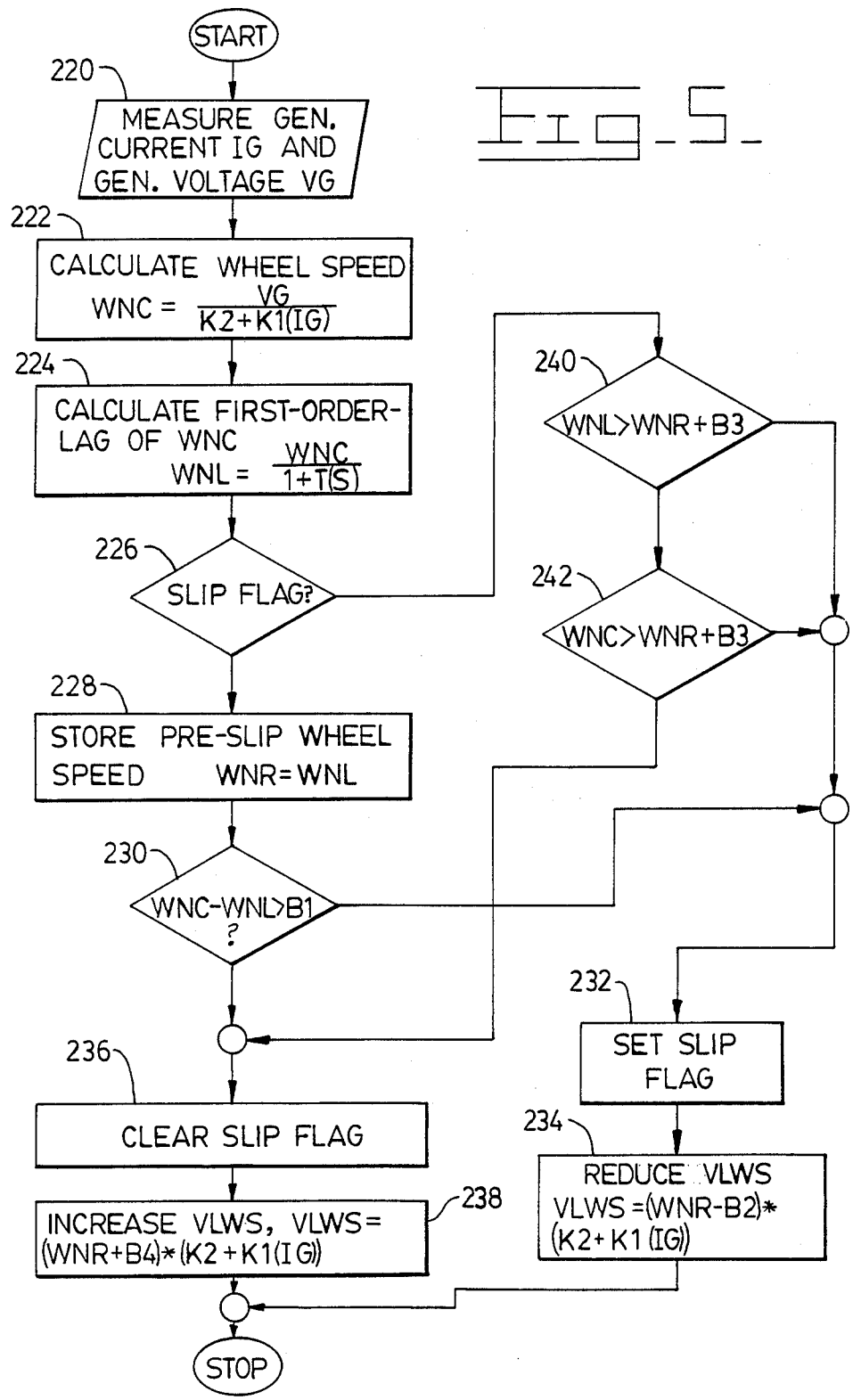
Fig_5_

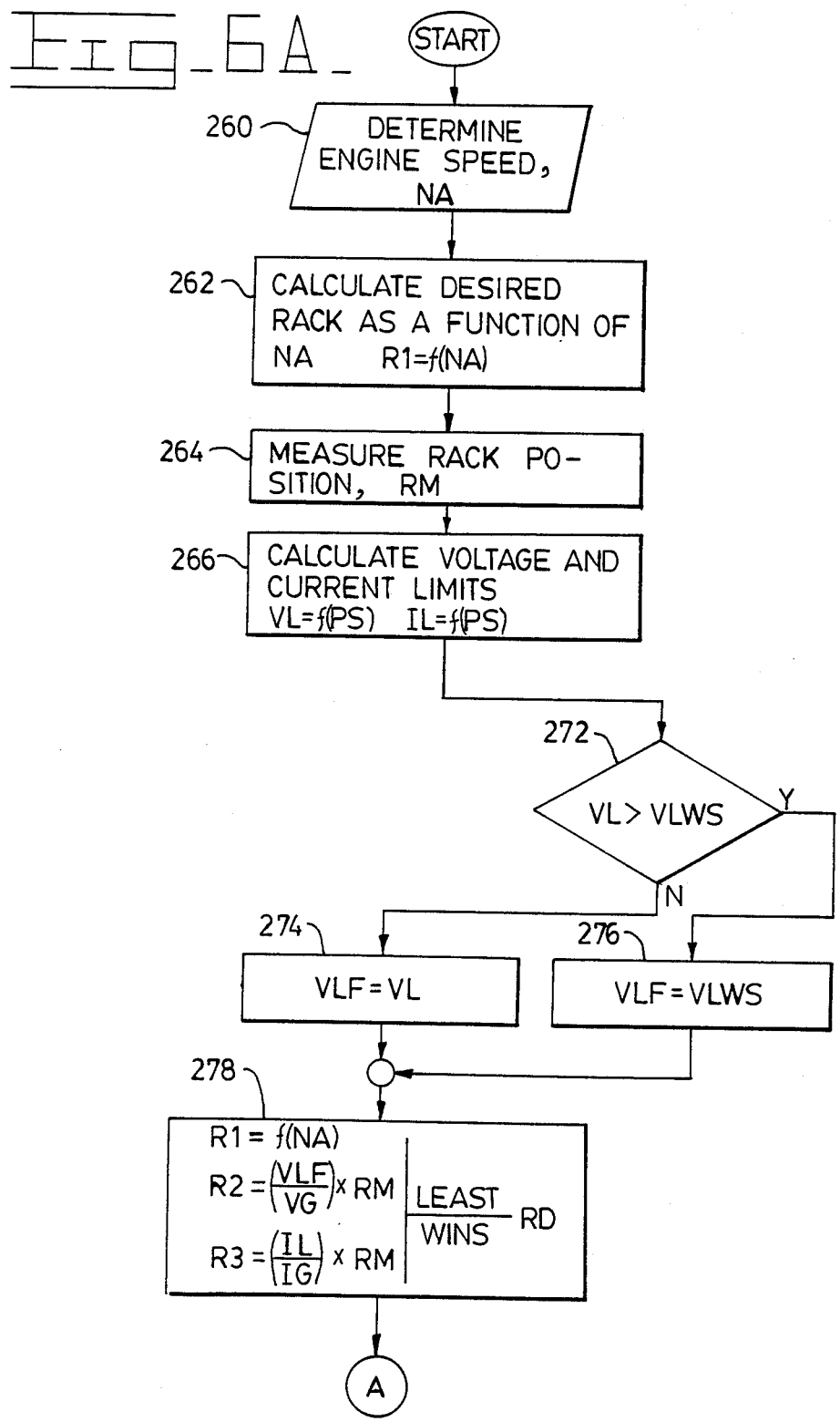

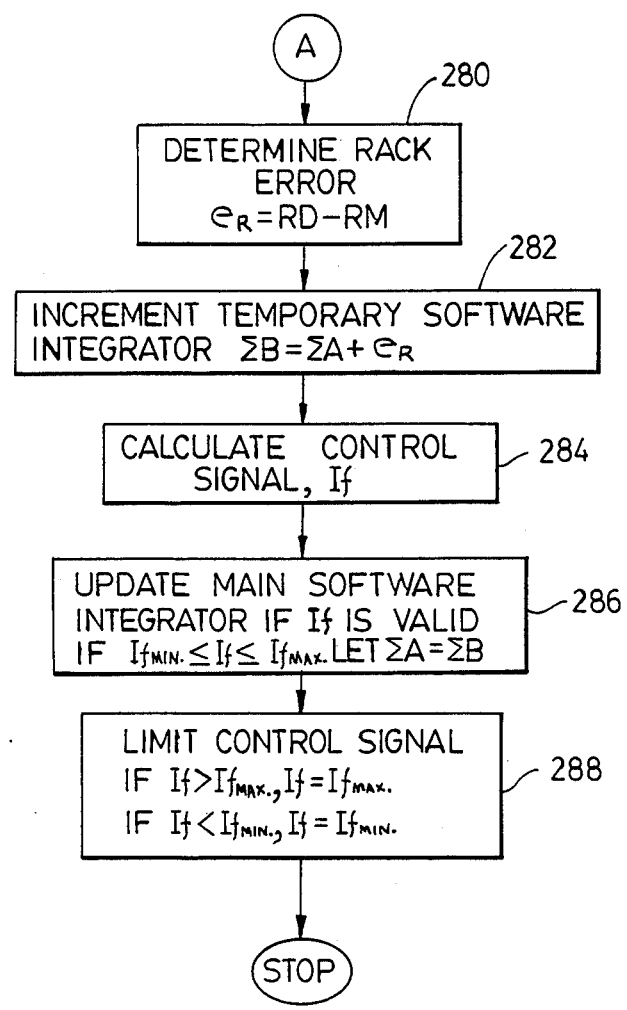
Fig_6B_

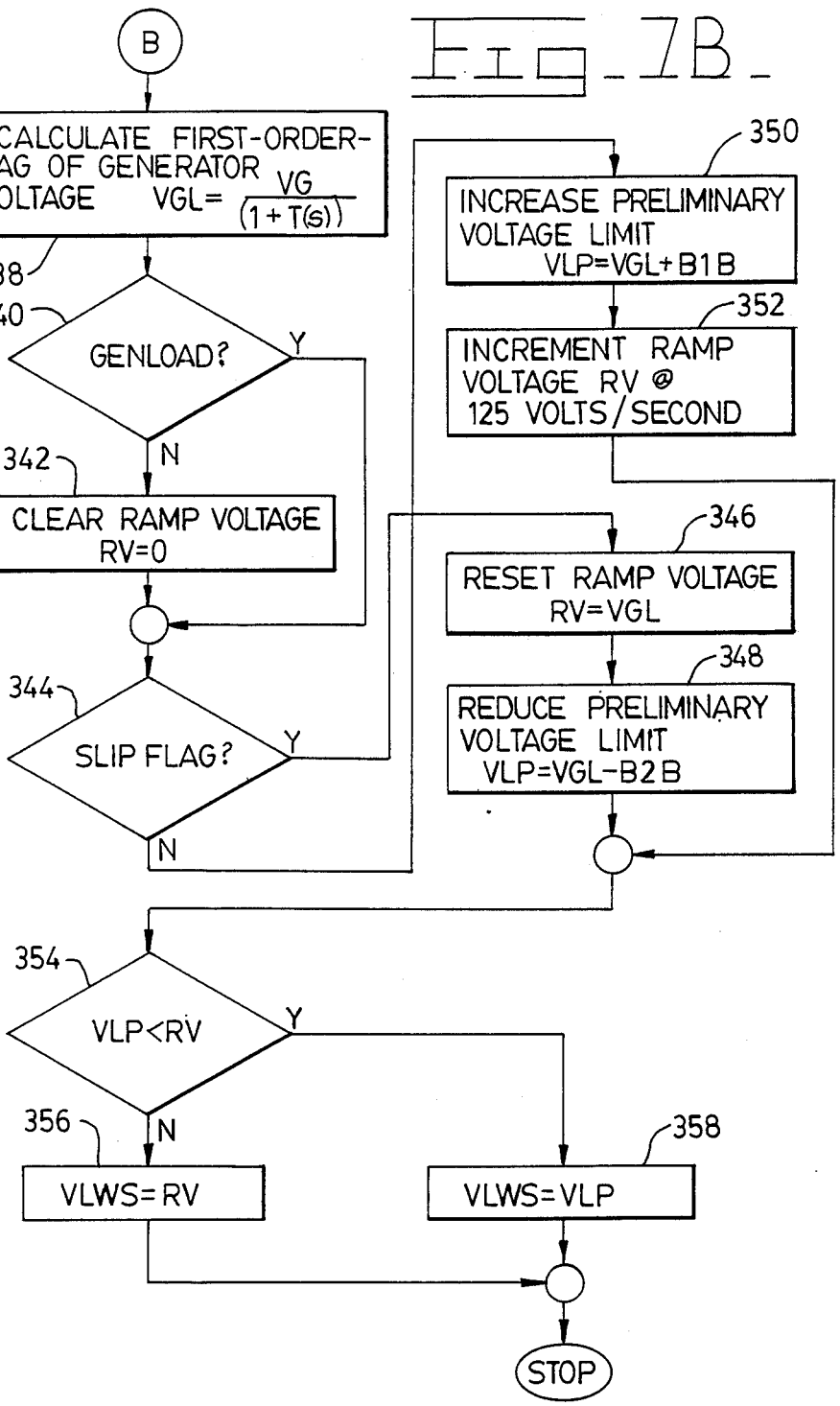

SYNCHRONOUS WHEEL SLIP STRATEGY FOR A LOCOMOTIVE GOVERNOR

TECHNICAL FIELD

The present invention relates to a system for detecting and controlling locomotive wheel slip and, more particularly, to a system for detecting and controlling synchronous wheel slip in a locomotive having at least one electric traction motor powered by an engine-generator unit controlled by a field current controller.

BACKGROUND ART

In a typical modern locomotive, a diesel engine is used to provide mechanical energy to a electric generator. The generator converts this mechanical energy into electrical power which is used to operate a plurality of direct current (dc) traction motors, each driving a separate drive axle having a pair of drive wheels connected thereto.

Wheel slip usually occurs during acceleration, and can take two forms. The first type of wheel slip is referred to as differential wheel slip which occurs when at least one set of drive wheels maintains tractive contact with the rail while at least one set of the remaining drive wheels slip. A second type of wheel slip is synchronous slip which occurs when none of the drive wheels maintains tractive contact with the rail and all of the drive wheels slip more or less simultaneously.

Wheel slip has long been a problem in locomotives and many systems have been developed which either reduce or completely eliminate wheel slip. A common scheme is to compare speed signals from driven and idler wheels or speed signals from each of several driven wheels or highest and lowest speed signals from traction motors. A slip condition is presumed to exist if the compared speed signals differ by more than a preselected magnitude. In the above mentioned systems, sensors, such as speed transducers, are used to produce the speed signals and such sensors add extra costs to wheel slip control systems. Furthermore, such systems are usually directed towards controlling only differential wheel slip and, as mentioned above, synchronous wheel slip also degrades locomotive performance.

A system for limiting both synchronous and differential wheel slip is disclosed in U.S. Pat. No. 4,463,289 which issued on Jul. 31, 1984 to Young. Beginning on line 35 of column 4, Young discusses a rate circuit for controlling synchronous wheel slip. The rate circuit provides a signal representing the rate of acceleration of the wheel with the greatest velocity. If the measured wheel acceleration is greater than a predetermined value, a rate signal is applied to the generator exciter which reduces exciter output and wheel speed. However, this scheme still requires sensors to detect the speed of each drive wheel.

The present invention is directed towards addressing the above mentioned problems by controlling synchronous wheel slip in a locomotive without requiring speed sensors. Other aspects, objects and advantages can be obtained from a study of the drawings, the disclosure, and the appended claims.

SUMMARY OF THE INVENTION

In accordance with one aspect of the invention there is provided an apparatus for controlling synchronous wheel slip of a locomotive having at least one electric traction motor powered by an engine-generator unit of the type having a field current controller. A current sensor detects a current produced by the engine-generator unit and produces a current signal responsive to the detected current. A voltage sensor detects a voltage produced by the engine-generator unit and produces a voltage signal responsive to the detected voltage. A processor processes the produced current and voltage signals to produce a calculated wheel speed signal indicative of the actual locomotive wheel speed, processes the calculated speed signal to produce a lagged wheel speed signal, derives a difference signal in response to a difference between the calculated and lagged wheel speed signals, and delivers a control signal to the field current controller in response to the difference signal being greater than a first preselected reference signal.

BRIEF DESCRIPTION OF THE DRAWINGS

FIG. 1 is a simplified block diagram of a locomotive microprocessor governor incorporating an embodiment of the immediate synchronous wheel slip controller.

FIG. 2 is a graph of generator current versus generator voltage divided by wheel speed for a locomotive having a particular combination of engine-generator unit and traction motor.

FIG. 3a is a graph of time versus wheel speed illustrating a relationship between a calculated wheel speed and a first-order-lag of the calculated wheel speed during non-slipping acceleration.

FIG. 3b is a graph of time versus wheel speed illustrating a relationship between a calculated wheel speed and a first-order-lag of the calculated wheel speed during a synchronous slip condition.

FIG. 4 is a graph of engine speed versus rack position for optimum operating efficiency of a diesel engine.

FIG. 5 is a flowchart of certain functions performed by an embodiment of the immediate synchronous wheel slip controller.

FIGS. 6a and 6b are flowcharts of certain functions performed by a locomotive governor which incorporates an embodiment of the immediate synchronous slip controller.

FIGS. 7a and 7b are flowcharts of certain functions performed by another embodiment of the immediate synchronous wheel slip controller.

BEST MODE FOR CARRYING OUT THE INVENTION

Figure 7A:
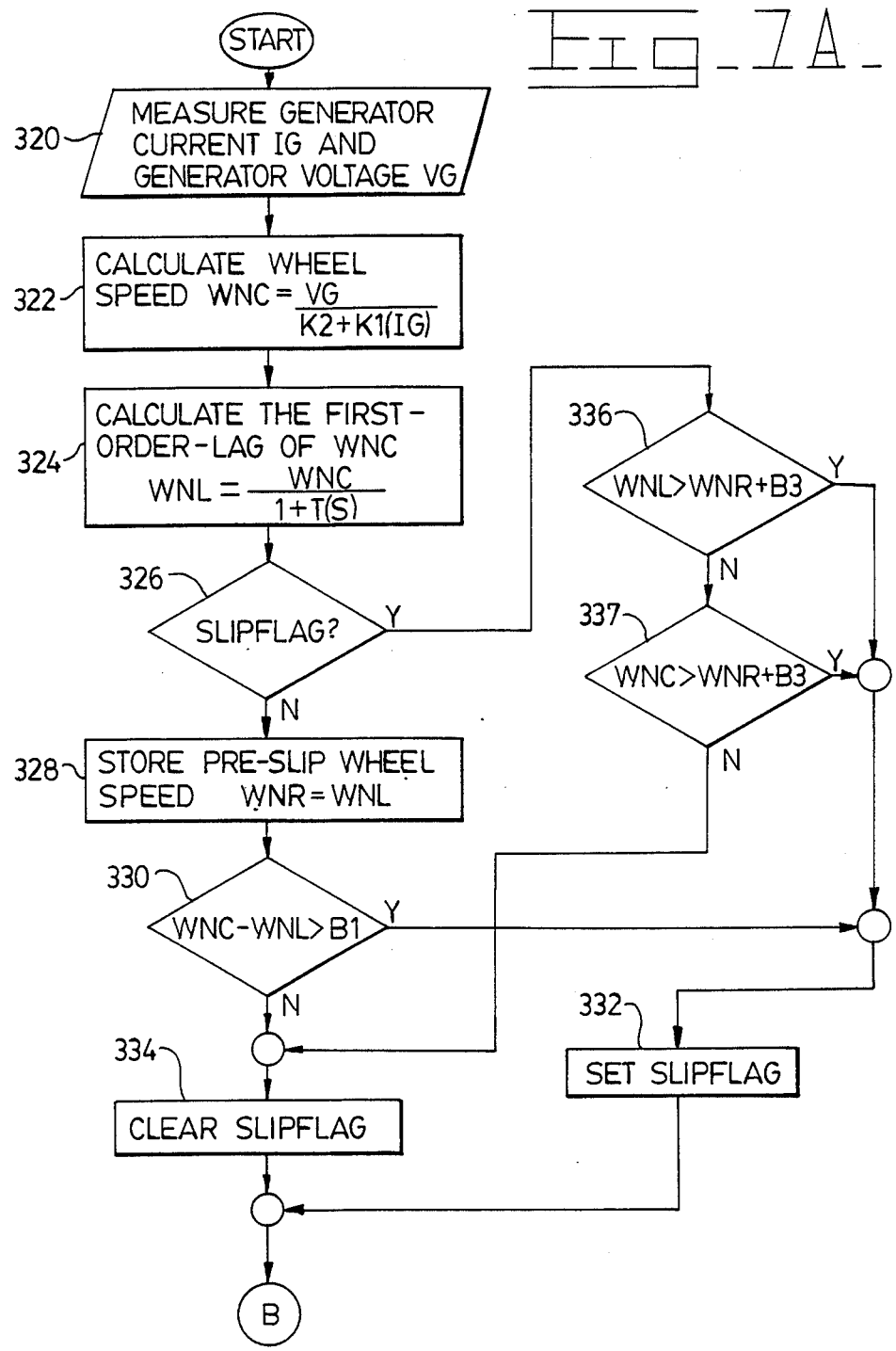

FIG. 1 illustrates a locomotive microprocessor governor control 10 which incorporates an embodiment of the immediate synchronous wheel slip controller 12. The microprocessor governor control 10 is similar to one disclosed in U.S. Pat. No. 4,498,016 issued on Feb. 5, 1985 to Earleson et al.; therefore, the governor control 10 will not be described extensively herein. The microprocessor governor control 10 is connected to an engine-generator unit 14 which includes a diesel engine 16 mechanically connected to drive a generator 18 by a drive shaft 20. The diesel engine 16 has a rack controller 22 for controlling the rate of fuel delivery to the engine 16. The generator 18 has a field current controller 24 for controlling power output thereof. The engine-generator unit 14 provides electrical power to a plurality of dc traction motors 26a–26c for driving a plurality of drive axles and drive wheels (not shown). The generator 18 produces an alternating current (ac) which is passed through a rectifier (not shown) to produce a dc current to power the traction motors 26a–26c.

A power selector 28, typically advanced in steps or "notches" by a human operator, is used to regulate the speed of the locomotive. In the preferred embodiment the power selector 28 has an idle notch and eight load notches. A selector sensor 30, is connected to the power selector 28 for producing a power signal in response to the position of the power selector 28. In the preferred embodiment, the selector sensor 30 includes a system of electrical switches which produce a mathematically encoded four-bit output signal in response to the position of the power selector 28. It is apparent to those skilled in the art that this sensing function can also be performed by any one of a number of devices such as a potentiometer, a transducer, etc.

An idle sensor 32 is connected to the power selector 28 for producing a load signal when the power selector 28 is not in the idle position. In the preferred embodiment the idle sensor 32 is a switch that closes when the power selector 28 is positioned in one of the eight load notches. It is forseeable that the power signal could also be used for determining when the power selector 28 is positioned in a load notch. The load signal is applied to an input terminal 33 of the synchronous wheel slip controller 12.

A desired engine speed calculator 34 has an input terminal 36 for receiving the power signal from the selector sensor 30. The desired engine speed calculator 34 accesses a first look-up table (not shown), stored in a memory 38. The first look-up table relates each notch setting to a desired engine speed and is used to produce a desired engine speed signal. The desired engine speed signal is applied to one input terminal 40 of a speed summer 42.

A magnetic pick-up sensor 44 is connected to the drive shaft 20 and produces an actual engine speed signal which is applied to a second input terminal 46 of the speed summer 42. It is apparent to those skilled in the art that this function can also be performed by a device such as a tachometer. The speed summer 42 produces a speed error signal $e_N$ in response to a difference between the actual and desired engine speed signals.

A speed controller 48 has an input terminal 49 for receiving the speed error signal $e_N$ from the speed summer 42. The speed controller 48 accesses a fuel delivery rate formula stored in the memory 38 and uses the formula to produce a fuel delivery rate signal as a function of the speed error signal $e_N$. The fuel delivery rate signal is applied to an input terminal 51 of the rack controller 22 to regulate actual engine speed so as to reduce the engine speed error $e_N$ signal to zero.

A current transformer 50 is connected to the generator 18 and produces a current signal in response to the ac generator current. In the preferred embodiment the current signal is actually a dc voltage signal which is proportional the the generator current. More particularly, the current transformer 50 produces a current which is rectified and applied to a burden resistor (not shown) to produce a dc voltage proportional to the ac generator current. A potential transformer 52 is connected to the generator 18 and produces a voltage signal in response to the ac voltage potential produced by the generator 18. The voltage signal is rectified to produce a dc signal proportional to the ac generator voltage. It is apparent to those skilled in the art that the current and voltage signals could be produced directly by monitoring the rectified dc generator current and voltage with the appropriate circuitry.

The synchronous wheel slip controller 12 has input terminals 54,56 for receiving the generator current and generator voltage signals from the current and potential transformers 50,52 respectively. The synchronous wheel slip controller 12 accesses an empirical wheel speed formula stored in the memory 38 and uses the formula to produce a calculated wheel speed signal as a function of the current and voltage signals. The synchronous wheel slip controller 12 then produces a lagged wheel speed signal by calculating a first-order-lag of the calculated wheel speed signal. If the lagged and calculated wheel speed signals differ by more than a preselected reference amount, the synchronous wheel slip controller 12 restricts the magnitude of a wheel slip voltage limit signal VLWS.

A desired rack calculator 58 forms part of a generator control loop 60 which is used to regulate the power produced by the generator 18. The desired rack calculator 58 has input terminals 62, 64, 66, 68, 69 for receiving the wheel slip voltage limit VLWS, actual engine speed, generator current, generator voltage, and power signals from the synchronous wheel slip controller 12, the engine speed sensor 44, the current transformer 50, the potential transformer 52, and the selector sensor 30, respectively. The desired rack calculator 58 accesses formulas and tables stored in memory 38 to calculate a desired rack signal as a function of these input signals.

The desired rack signal is applied to a first input terminal 70 of a rack summer 72. A rack sensor 74 detects actual rack position and produces an actual rack signal which is applied to a second input terminal 76 of the rack summer 72. The rack summer 72 produces a rack error signal $e_R$ in response to a difference between the actual and desired rack signals.

A control signal calculator 78 has an input terminal 80 for receiving the rack error signal $e_R$ from the rack summer 72. The control signal calculator 78 accesses a control signal formula in the memory 38 and uses the formula to produce a control signal $I_f$ as a function of rack error $e_R$. The control signal $I_f$ is applied to an input terminal 82 of the field current controller 24 to regulate generator power output so as to reduce the rack error $e_R$ signal to zero.

Industrial Applicability

Referring now to FIG. 5, a subroutine used to control an embodiment of the synchronous wheel slip controller 12 is illustrated by a flowchart. In the block 220 the generator current and voltage IG,VG are determined by monitoring the current and potential transformers 50, 52 respectively. In the block 222 the empirical wheel speed formula is used to calculate locomotive wheel speed as a function of the generator current and voltage. In particular, the wheel speed formula is as follows:

$$WNC = VG/(K2 + K1(IG))$$

where WNC is the calculated wheel speed, VG is the generator voltage, IG is the generator current, and K1 and K2 are empirically determined constants for a particular final drive ratio and wheel diameter combination. An example of a curve generated by the wheel speed formula is shown FIG. 2. The constants K1, K2 are empirically determined by measuring generator current and voltage IG, VG at various locomotive speeds under controlled conditions.

A first-order-lag of calculated wheel speed is determined in the block 224 using the following Laplace transform equation:

$$WNL = WNC/(1 + T(S))$$

where WNL is the lagged wheel speed, WNC is the calculated wheel speed determined in the block 222, T is an empirically derived time constant in seconds, and S is the Laplace transform operator. The use of software for implementing first-order-lags is commonly known in microprocessor based control systems.

A relationship between the calculated wheel speed WNC and the lagged wheel speed WNL during locomotive acceleration without wheel slip is illustrated in FIG. 3a. Initially, at A, the locomotive is traveling at constant speed and the calculated wheel speed WNC equals the lagged wheel speed WNL. In response to an operator demand for greater locomotive speed, the power produced by the generator increases. As the locomotive accelerates, the locomotive wheel speed WNC increases along the solid line. It eventually levels off at B where the power fed to the traction motor equals the power required to operate the locomotive at the new speed. The lagged wheel speed WNL follows the dashed line of FIG. 3a and essentially lags the calculated speed WNC by "X" mph during non-slipping acceleration. Furthermore, the difference "X" between the calculated wheel speed WNC and the lagged wheel speed WNL is related to, and can be used as a measure of, the calculated wheel speed WNC.

Continuing with the discussion of FIG. 5, a slip flag is checked in the decision block 226. Initially, the slip flag is not set; therefore, control is passed to the block 228 where the lagged wheel speed WNL is stored in the variable reference wheel speed WNR. The reference wheel speed WNR is used later in the routine to calculate the wheel slip voltage limit VLWS if synchronous wheel slip is detected and to determine if synchronous wheel slip has stopped.

In the decision block 230 a difference between the calculated wheel speed WNC and the lagged wheel speed WNL is compared to a first empirically determined reference B1. If the compared speeds differ by more than the first reference B1, a synchronous slip condition exists and the routine continues to the block 232 where the slip flag is set.

A better understanding of the relationship between the calculated wheel speed WNC and the lagged wheel speed WNL during synchronous wheel slip can be gained by referring to FIG. 3b. When synchronous slip occurs, the load on the traction motors is reduced causing an instantaneous decrease in generator current and increase in generator voltage. Therefore, if synchronous wheel slip occurs, the calculated wheel speed WNC will change rapidly as shown by the solid line. However, the lagged wheel speed WNL will change much slower due to the lag introduced by the Laplace transform equation. The difference between the calculated wheel speed WNC and lagged wheel speed WNL is approximately proportional to the rate-of-change of the calculated wheel speed WNC. More particularly, as the rate-of-change of the calculated wheel speed increases, the difference between the calculated wheel speed WNC and lagged wheel speed WNL also increases. Therefore, synchronous slip can be detected by comparing the difference between the calculated wheel speed WNC and the lagged wheel speed WNL to an empirically determined value at which synchronous slip occurs.

Continuing with the discussion of FIG. 5, after setting the slip flag in the block 232 control is subsequently passed to the block 234. In the block 234 the wheel slip voltage limit VLWS is calculated using the following voltage limit formula:

$$VLWS = (WNR - B2)*(K2 + K1(IG))$$

where B2 is an empirically determined constant. The wheel slip voltage limit VLWS is used later in the calculation of the control signal $I_f$. More particularly, when wheel slip is detected, the reference wheel speed WNR is reduced by a second empirically determined reference B2. This results in a reduction in the magnitude of the control signal $I_f$ and subsequently a reduction of the locomotive wheel speed.

If wheel slip is not detected in the decision block 230, control is passed to the block 236 where the slip flag is cleared. Thereafter, control is passed to the block 238 where a new wheel slip voltage limit is calculated using the following equation:

$$VLWS = (WNR + B4)*(K2 + K1(IG))$$

where B4 is an empirically determined constant. This prevents the wheel slip voltage limit from limiting generator power during a non-slipping condition.

The decision blocks 240 and 242 are used to determine if a previously detected slip condition has ended. More specifically, synchronous slip has stopped if both the lagged wheel speed WNL and calculated wheel speed WNC are less than the reference wheel speed WNR plus a third empirically determined reference B3. If wheel slip has ended, control is passed to the block 236 where the slip flag is cleared, and then to the block 238 where the wheel slip voltage limit VLWS is increased. Similarly, if a slip condition still exists, control is passed to the block 232 where the slip flag is set, and then to the block 234 where the wheel slip voltage limit VLWS is reduced.

Referring now to FIGS. 6a and 6b a flowchart illustrative of software for controlling the generator control loop 60 is described. In the block 260 the actual engine speed NA is determined by monitoring the magnetic pick-up sensor 44. Thereafter, in the block 262, a first preliminary desired rack R1 is calculated as a function of the actual engine speed using a second look-up table stored in the memory 38. The second look-up table equates the actual engine speed to a desired rack setting as illustrated in FIG. 4.

In the block 264 a measured rack position RM is determined by monitoring the rack sensor 74. Subsequently, in the block 266, selector voltage and current limits VL, IL are calculated as a function of the position of the power selector 28.

In the decision block 272 the selector voltage limit VL is compared to the wheel slip voltage limit VLWS. Thereafter, in the blocks 274, 276 a final voltage limit VLF is equated to the lesser of the compared voltage limits VLWS, VL.

In the block 278, the desired rack signal RD is set to the lesser of three preliminary rack signals R1, R2, R3. The first preliminary rack signal R1 was previously calculated in the block 262 as a function of measured engine speed NA. The second and third preliminary rack signals R2, R3 are limited by the final voltage VLF and the current limit IL, respectively. In the block 280 a rack error $e_R$ is produced in response to a difference between the measured rack position RM and the desired rack signal RD.

Finally in the block 284, the control signal $I_f$ is calculated using a transfer function of the PID (proportional, integral, differential) type which is consistent with known control theory. More particularly the control signal is calculated using the following control signal formula:

$$I_f = K_8 * e_R + K_9 * \Delta e_R + K_{10} * \Sigma B$$

where $K_8$, $K_9$, and $K_{10}$ are empirically determined constants and $\Sigma B$ is a temporary software integrator.

The blocks 286 and 288 are optional and are used to update the main software integrator $\Sigma A$ and assure the control signal $I_f$ is valid, respectively.

In summary, when synchronous slip occurs, the synchronous wheel slip controller 12 produces a wheel slip voltage limit VLWS which is used by the desired rack calculator 58 to limit the desired rack signal RD. As a result, a rack error $e_R$ occurs causing the control signal calculator 78 to reduce the control current $I_f$. Subsequently, the actual locomotive wheel speed is incrementally reduced until the synchronous slip condition is no longer detected by the synchronous wheel slip controller 12.

Referring now to FIGS. 7a and 7b, a subroutine used to control an alternate embodiment of the synchronous slip controller 12 is illustrated by a flowchart. FIG. 7a is essentially the same as previously discussed FIG. 5; therefore, only FIG. 7b will be described.

In the block 338 a first-order-lag of the measured generator voltage VG is calculated using the following Laplace transform equation:

$$VGL = VG/(1 + T(S))$$

where VGL is the lagged generator current, VG is the measured generator current, T is an empirically derived time constant in seconds, and S is the Laplace operator. The Laplace transform equation effectively filters noise from the generator voltage VG, thereby providing a more stable signal with which to regulate the wheel slip voltage limit VLWS.

In the block 340 the idle sensor 32 is monitored to determine if the locomotive is in an idle or load condition. If an idle condition exists, a ramp voltage RV is set to zero in the block 342. Under load conditions, the ramp voltage RV is used to ramp the control signal $I_f$ at a predetermined rate. This strategy will be explained in greater detail below.

Subsequently, the slip flag is checked in the decision block 344. If the slip flag is set, control is passed to the block 346 where a ramp voltage RV is reset to the lagged generator voltage VGL. Thus, when a slip condition ends, ramping resumes at a level equal to the lagged generator voltage VGL.

Thereafter, in the block 348, a preliminary voltage limit VLP is set to the lagged generator voltage VGL minus an empirically determined reference B2B. Under a slip condition, the preliminary voltage limit VLP is continuously reduced in this manner until the slip condition ends.

If the slip flag is not set in the decision block 344, control is passed to the block 350. In the block 350 the preliminary voltage limit VLP is set to the lagged generator voltage VGL plus an empirically determined reference BIB. This prevents the preliminary voltage limit VLP from being less than the ramp voltage RV during a non-slipping condition.

Subsequently, in the block 352 the ramp voltage RV is incrementally increased at a preselected rate. In the preferred embodiment a rate of 125 volts/second is selected to allow the generator voltage to reach the maximum rated voltage of 1250 volts over a ten second interval. As mentioned above, the ramp voltage RV is used to ramp the control signal at a predetermined rate. Therefore, the wheel torque gradually increases under increasing load and the ramping scheme achieves maximum load over a ten second time interval.

Control is then passed to the block 354 where the ramp voltage RV is compared to the preliminary voltage limit VLP. Subsequently, the wheel slip voltage limit VLWS is set to the lesser of the compared currents RV, VLP in the blocks 356, 358. The wheel slip voltage limit VLWS is used in the generator control loop 60, as previously described in the discussion of FIGS. 6a and 6B.

While the present invention is described for use with the microprocessor governor control 10 disclosed in Earleson et al., it is recognized that such a synchronous wheel slip controller 12 could be used in combination with numerous other locomotive governors.

We claim:

1. An apparatus for controlling synchronous wheel slip of a locomotive having at least one electric traction motor powered by an engine-generator unit of the type having a field current controller, comprising:

a current sensing means for detecting a current produced by said engine-generator unit and producing a current signal responsive to said detected current;

a voltage sensing means for detecting a voltage produced by said engine-generator unit and producing a voltage signal responsive to said detected voltage; and, a processor means for receiving said produced current and voltage signals, processing said produced current and voltage signals to produce a calculated wheel speed signal indicative of the actual locomotive wheel speed, processing said calculated wheel speed signal to produce a lagged wheel speed signal, deriving a difference signal in response to a difference between said calculated and lagged wheel speed signals, and delivering a control signal to said field current controller in response to said difference signal being greater than a first preselected reference signal in order to reduce wheel slip.

2. The apparatus set forth in claim 1, wherein the power produced by said engine-generator unit is controllably modified in response to said field current controller receiving said control signal.

3. The apparatus set forth in claim 2, wherein the power produced by said engine-generator unit is controllably modified such that said difference signal is reduced to a magnitude less than said first preselected reference signal.

4. The apparatus set forth in claim 1, wherein said processor means includes a memory, said memory having stored therein a formula including empirically derived constants associated with a given engine-generator unit and traction motor combination for calculating a locomotive wheel speed as a function of said produced current and voltage signal.

5. The apparatus set forth in claim 1, wherein during the production of said calculated wheel speed signal, said processing means:
produces a product signal in response to a product of said produced current signal and a first predetermined constant;
produces a sum signal in response to a sum of said product signal and a second predetermined constant; and,
produces said calculated wheel speed signal in response to a quotient of said produced voltage signal divided by said sum signal.

6. The apparatus set forth in claim 1, including:
a power selector having a plurality of power settings;
a selector sensing means for producing a power signal in response to the position of said power selector;
a desired speed calculator means for receiving said power signal and producing a desired engine speed signal in response to said power signal;
a speed sensing means for producing a actual engine speed signal in response to the speed of said engine;
a speed summer means for receiving said actual and desired engine speed signals and producing a speed error signal in response to a difference between said actual and desired engine speed signals;
a speed controller means for receiving said speed error signal and producing a rack setting signal in response to said speed error signal;
a rack controller means for receiving said rack setting signal and controlling engine speed in response to said rack setting signal;
a rack sensing means for producing a measured rack signal in response to the position of said rack controller means;
a synchronous wheel slip controller means for receiving said produced current and voltage signals, processing said produced current and voltage signals to produce said difference signal, and producing a wheel slip voltage limit signal in response to said difference signal being greater than said first preselected magnitude;
a desired rack calculator for receiving said wheel slip voltage limit, produced voltage, and actual engine speed signals and processing said received signals to produce a desired rack signal;
a rack summer means for receiving said desired and actual rack signals and producing a rack error signal in response to a difference between said desired and actual rack signal; and,
a control signal calculator means for receiving said rack error signal and processing said rack error signal to produce said control signal.

7. The apparatus set forth in claim 6, wherein said processor means includes a memory, said memory having stored therein a formula including empirically derived constants associated with a given engine-generator unit and traction motor combination for calculating said control signal as a function of said rack error signal, the time rate of change of the rack error signal and the integral of several rack error signals.

8. The apparatus set forth in claim 7, wherein the power produced by said engine-generator unit is controllably modified in response to said field current controller receiving said control signal such that said rack error signal is reduced to zero.

9. The apparatus set forth in claim 6, wherein said synchronous wheel slip controller means produces a slip flag signal in response to said difference signal being greater than said first preselected reference signal.

10. The apparatus set forth in claim 9, wherein said synchronous wheel slip controller means sets a reference wheel speed signal equal to said lagged wheel speed signal in the absence of said slip flag signal.

11. The apparatus set forth in claim 10, wherein said synchronous wheel slip controller means:
cancels said slip flag signal in response to said difference signal being less than or equal to said first preselected reference signal; and,
cancels said slip flag signal in response to said calculated wheel speed signal being less than or equal to a sum of said reference wheel speed signal and a second preselected reference signal and said lagged wheel speed signal being less than or equal to a sum of said reference wheel speed signal and said second preselected reference signal.

12. The apparatus set forth in claim 6, wherein said desired rack calculator means produces a voltage limit signal in response to said power signal and limits a final voltage limit signal to the lesser of said voltage limit and wheel slip voltage limit signals.

13. The apparatus set forth in claim 12, wherein said desired rack calculator produces a first quotient signal in response to the quotient of said final voltage limit signal divided by said produced voltage signal, produces a current limit signal in response to said power signal, produces a second quotient signal in response to the quotient of said current limit signal divided by said produced current signal, produces a first preliminary rack signal in response to said engine speed signal, produces a second preliminary rack signal in response to the product of said measured rack signal and said first quotient signal, produces a third preliminary rack signal in response to the product of said measured rack signal and said second quotient signal, and limits said desired rack signal to the lesser of said preliminary rack signals.

14. A method for controlling wheel slip of a locomotive having at least one electric traction motor powered by an engine-generator unit of the type having a field current control, comprising the steps of:
detecting a current produced by said engine-generator unit and producing a current signal responsive to said detected current;
detecting a voltage produced by said engine-generator unit and producing a voltage signal responsive to said detected voltage;
processing said produced current and voltage signals to produce a calculated wheel speed signal indicative of the actual locomotive wheel speed;
processing said calculated wheel speed signal to produce a lagged wheel speed signal indicative of a first-order-lag of said calculated wheel speed signal;
deriving a difference signal in response to a difference between said calculated and lagged wheel speed signals; and,
delivering a control signal to said field current controller in response to said difference signal being greater than a first preselected reference signal in order to reduce wheel slip.

15. The method set forth in claim 14, including producing a slip flag signal in response to said difference signal being greater than said first preselected reference signal.

16. The method set forth in claim 15, wherein a reference wheel speed signal is set to said lagged wheel speed signal in the absence of said slip flag signal.

17. The method set forth in claim 16, including:
cancelling said slip flag signal in response to said difference signal being less than or equal to said first preselected reference signal; and,
cancelling said slip flag signal in response to said calculated wheel speed signal being less than or equal to the sum of said reference wheel speed signal and a second preselected reference signal and said lagged wheel speed signal being less than or equal to the sum of said reference wheel speed signal and said second preselected reference signal.

18. The method set forth in claim 14, wherein producing said calculated wheel speed signal includes:
producing a product signal in response to a product of said produced current signal and a first predetermined constant signal;
producing a sum signal in response to a sum of said product signal and a second predetermined constant; and,
producing said calculated wheel speed signal in response to a quotient of said produced voltage signal divided by said sum signal.

19. The method set forth in claim 18 wherein said predetermined constants are empirically derived and selected in response to the magnitudes of said produced current and voltage signals.

20. An apparatus for controlling wheel slip in a locomotive of the type having at least one electric traction motor powered by an engine-generator unit, comprising:
a power selector having a plurality of selectable positions;
a selector sensing means for producing a power signal in response to the position of said power selector;
a desired speed calculator means for receiving said power signal and producing a desired engine speed signal in response to said power signal;
a speed sensing means for producing a actual engine speed signal in response to the speed of said engine;
a speed summer means for receiving said actual and desired engine speed signals and producing a speed error signal in response to a difference between said actual and desired engine speed signals;
a speed controller means for receiving said speed error signal and producing a rack setting signal in response to said speed error signal;
a rack controller means for receiving said rack setting signal and controlling engine speed in response to said rack setting signal;
a rack sensing means for producing a measured rack signal in response to the position of said rack controller means;
a current sensing means for detecting a current produced by said engine-generator unit and producing a current signal responsive to said detected current;
a voltage sensing means for detecting a voltage produced by said engine-generator unit and producing a voltage signal responsive to said detected voltage;
a synchronous wheel slip controller for receiving said produced current and voltage signals, producing a product signal in response to a product of said produced current signal and a first predetermined constant, producing a sum signal in response to a sum of said product signal and a second predetermined constant, producing a calculated wheel speed signal indicative of the actual locomotive wheel speed in response to a quotient of said voltage signal divided by said sum signal, processing said calculated wheel speed signal to produce a lagged wheel speed signal, and producing a wheel slip voltage limit signal in response to a difference between said calculated and lagged wheel speed signals being greater than a preselected reference;
a desired rack calculator for receiving said wheel slip voltage limit, produced voltage and actual engine speed signals and processing said received signals to produce a desired rack signal;
a control signal calculator means for receiving said desired and actual rack signals and producing a control signal in response to a difference between said desired and actual rack signals; and,
a field current controller for receiving said control signal and controlling the power produced by said generator in response to said control signal.

* * * * *